US008010522B2

(12) United States Patent
Dewey et al.

(10) Patent No.: US 8,010,522 B2
(45) Date of Patent: Aug. 30, 2011

(54) SYSTEM, METHOD AND PROGRAM PRODUCT FOR DETECTING SQL QUERIES INJECTED INTO DATA FIELDS OF REQUESTS MADE TO APPLICATIONS

(75) Inventors: David Bryan Dewey, Alpharetta, GA (US); David Charles Means, Woodstock, GA (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 11/952,322

(22) Filed: Dec. 7, 2007

(65) Prior Publication Data

US 2009/0150374 A1    Jun. 11, 2009

(51) Int. Cl.
*G06F 7/00* (2006.01)
(52) U.S. Cl. .................... 707/714; 707/724; 707/754
(58) Field of Classification Search .............. 707/5, 714
See application file for complete search history.

(56) References Cited

U.S. PATENT DOCUMENTS

| | | | |
|---|---|---|---|
| 7,343,626 B1* | 3/2008 | Gallagher | 726/25 |
| 7,444,331 B1* | 10/2008 | Nachenberg et al. | 1/1 |
| 2003/0204719 A1 | 10/2003 | Ben-Itzhak | |
| 2005/0198099 A1 | 9/2005 | Motsinger et al. | |
| 2005/0203921 A1 | 9/2005 | Newman et al. | |
| 2006/0136374 A1* | 6/2006 | Shelest et al. | 707/3 |
| 2006/0212438 A1* | 9/2006 | Ng | 707/4 |
| 2006/0212941 A1 | 9/2006 | Bronnikov et al. | |
| 2007/0074169 A1* | 3/2007 | Chess et al. | 717/126 |
| 2007/0143271 A1* | 6/2007 | Yuval et al. | 707/3 |
| 2007/0185863 A1* | 8/2007 | Budzik et al. | 707/5 |
| 2007/0192863 A1* | 8/2007 | Kapoor et al. | 726/23 |
| 2007/0294203 A1* | 12/2007 | Seitz | 707/1 |
| 2008/0016339 A1* | 1/2008 | Shukla | 713/164 |
| 2009/0049547 A1* | 2/2009 | Fan | 726/22 |

OTHER PUBLICATIONS

Jaroslaw Skaruz, Franciszek Seredynski, "Recurrent Neural Networks Towards Detection of SQL Attack", Jan. 17, 2007.*

* cited by examiner

*Primary Examiner* — Don Wong
*Assistant Examiner* — Binh V Ho
(74) *Attorney, Agent, or Firm* — Arthur J. Samodovitz

(57) ABSTRACT

System, method and program product for detecting a malicious SQL query in a parameter value field of a request. The parameter value field is searched for query operands, characters and/or symbols and combinations of query operands, characters and/or symbols indicative of malicious SQL injection. A respective score assigned to each of the query operands, characters and/or symbols or combinations of query operands, characters and/or symbols found in the parameter value field is added to yield a total score for at least two of the query operands, characters and/or symbols or combinations of query operands, characters and/or symbols found in the parameter value field. Responsive to the total score exceeding a threshold, the request is blocked.

18 Claims, 2 Drawing Sheets

SYSTEM, METHOD AND PROGRAM PRODUCT FOR DETECTING SQL QUERIES INJECTED INTO DATA FIELDS OF REQUESTS MADE TO APPLICATIONS

FIELD OF THE INVENTION

The present invention relates generally to security of computer systems, and more specifically to detection of SQL queries injected into data fields of requests made to applications.

BACKGROUND OF THE INVENTION

Relational data bases and other file systems may use Structured Query Language ("SQL") to phrase queries to access the relational data base. For example, in a relational data base, data items can be organized into rows and columns with indexes for each row and column. An SQL query can indicate a search for data items that satisfy a single criteria or a combination of search criteria, such as matching a specified index for a row AND matching another specified index for a column. For example, rows of a table can represent records and columns of the table can represent fields or attributes of the records. Also, data in one table identified by the row and column indexes of the one table can be used to index into another table to collect additional information.

The following is an example of a SQL query: SELECT TOP 1 name_FROM sysobjects WHERE xtype='U'. "WHERE" is a query operand and "name" is data. This SQL query retrieves the first value found in the column "name" from the table "sysobjects" where the value of the column "xtype" is equal to "U". The following are examples of known query operands used with data or parameter values to search an SQL data base: AND, NAND, OR, NOR, EXCLUSIVE OR, WHERE, UNION and LIKE. A SQL query can also include characters and symbols such as the following used with data or parameter values to search an SQL data base: =, >, <, #, ", @, /* and */.

Some web applications are vulnerable to an attack known as SQL injection. In this type of attack, hackers inject SQL queries into parameter/data values of requests made to the web application such as parameter values for GET and POST requests. Vulnerable applications may not detect the SQL query in the parameter values included in the request, may incorporate the parameter values as a SQL query and send the SQL query to a SQL database for processing. The resultant SQL query can be malicious and damage the database or cause an unwarranted search into a SQL database and post sensitive data for the hacker.

It is known to maintain a list of common types of SQL queries that may be injected into parameter value fields of a request to a web application, and compare all parameter values in the request against the list to determine if they match. The following is an example of a malicious type of SQL query represented in the list (in regex format): SELECT.* FROM.* (WHERE)?, EXEC xp.* or 1=1. If a parameter value in a request to the application matches an entry in the list, then the parameter value is presumed to be malicious and discarded. One problem with such a scanning system is the large number of entries in the list, and the time required to compare each new query to the entries in the list. Another problem is that the list may inadvertently omit one or more malicious types of SQL queries.

An object of the present invention is to detect attempts at SQL injection.

Another object of the present invention is to simplify the detection of SQL injection and minimize false positives and false negatives/evasions.

SUMMARY OF THE INVENTION

The present invention resides in a system, method and program product for detecting a malicious SQL query in a parameter value field of a request. The parameter value field is searched for query operands, characters and/or symbols and combinations of query operands, characters and/or symbols indicative of malicious SQL injection. A respective score assigned to each of the query operands, characters and/or symbols or combinations of query operands, characters and/or symbols found in the parameter value field is added to yield a total score for at least two of the query operands, characters and/or symbols or combinations of query operands, characters and/or symbols found in the parameter value field. Responsive to the total score exceeding a threshold, the request is blocked.

According to a feature of the present invention, the query operands, characters and/or symbols and combinations of query operands, characters and/or symbols are Data Definition Language, Data Modification Language, Stored Procedures, Boolean Operators, Equality Operators, Functions, Keywords, Suspicious Symbols and/or Highly Suspicious Symbols type.

According to another feature of the present invention, at least one of the combinations of query operands, characters and/or symbols includes a trigger and pre-trigger query operand, a determination is made whether both the trigger and pre-trigger query operands are contained in a same parameter value field of the request and no points are added toward the total score unless both the trigger and pre-trigger query operands, characters and/or symbols are found in a same parameter value field of the request.

DETAILED DESCRIPTION OF THE PREFERRED EMBODIMENTS

Figure 1:
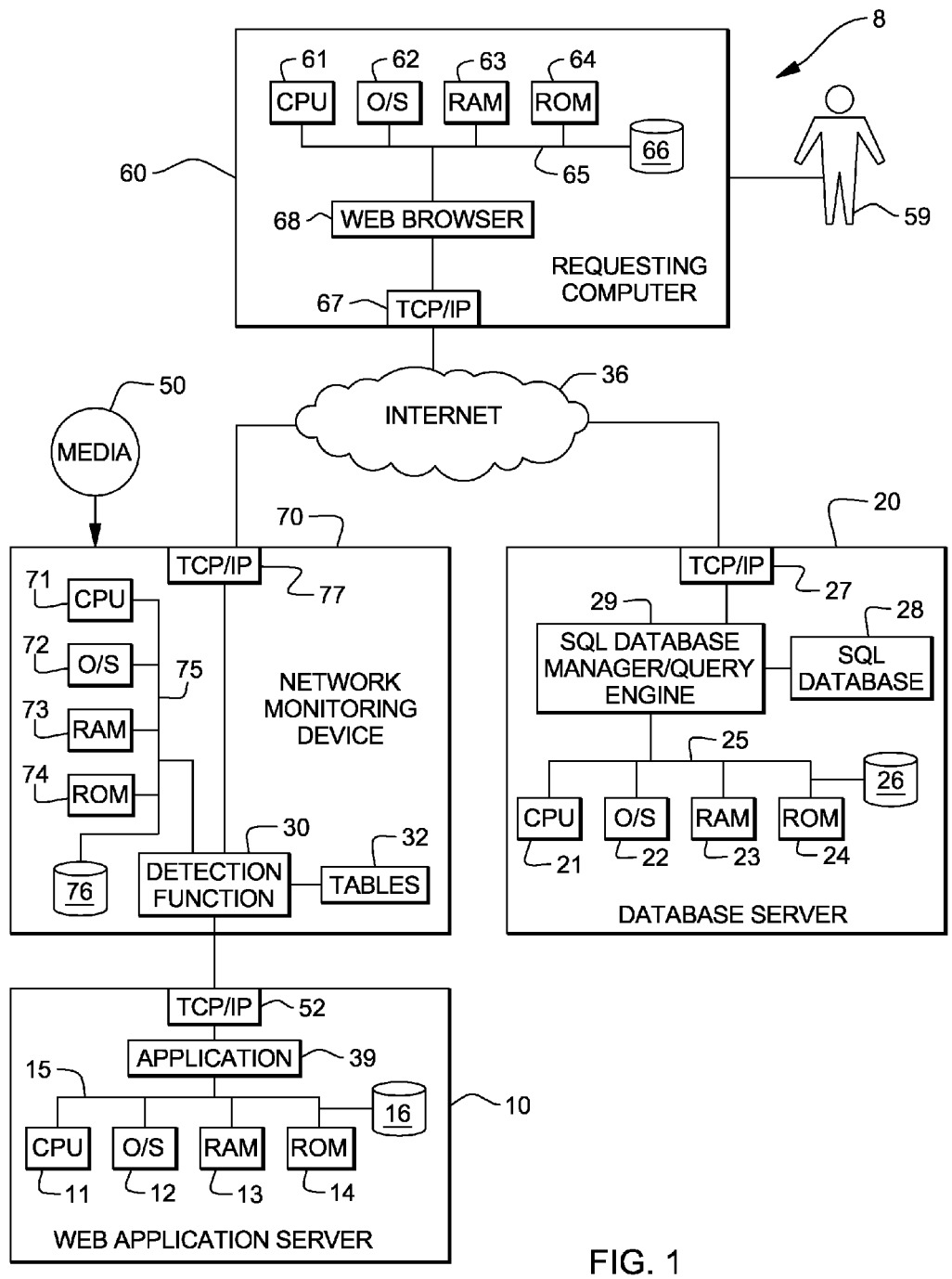
FIG. 1 is a block diagram of a distributed computer system which includes a detection program according to the present invention to detect attempts to inject SQL queries into parameter values of requests made to an application.

The present invention will now be described in detail with reference to the Figures. FIG. 1 illustrates a distributed computer system generally designated 8 which includes the present invention. Distributed computer system 8 includes an application server 10 (such as a web server) with a known processor 11, operating system 12, RAM 13 and ROM 14 on a common bus 15, and a disk storage 16 and TCP/IP adapter card 52. Server 10 also includes a known application 39 (such as a web application) which is capable of making SQL (or other relational data base) queries to a SQL (or other relational database) database manager/query engine 29 to extract data from a SQL (or other relational) database 28. Application 39 may make these SQL queries pursuant to a request (such as a GET or POST request) from a user 59 of application 39. SQL query engine 29 and SQL database 28 can reside in server 10 or in another server 20 as shown. Server 20 also includes a known processor 21, operating system 22, RAM 23 and ROM 24 on a common bus 25, and a disk storage 26 and TCP/IP adapter card 27. Database server 20 is coupled to application server 10 via a network 36 such as the Internet. User 59 is using a (requesting) computer 60 with a known processor 61, operating system 62, RAM 63 and ROM 64 on a common bus 65, and a disk storage 66, web browser 68, and TCP/IP adapter card 67.

A network monitoring (computing) device 70 such as a firewall, router, gateway server, etc. is logically interposed between the Internet 36 and application server 10. Server 70 also includes a known processor 71, operating system 72, RAM 73 and ROM 74 on a common bus 75, and a disk storage 76 and TCP/IP adapter card 77. Server 70 also includes a detection function 30 (implemented as computer software and/or computer hardware) according to the present invention to scan requests (such as GET and POST requests) made by remote users (such as user 59 at computer 60 via network 36) to application 39 in computer 10 to detect SQL injection in such requests. Detection Function 30, in computer software form, is stored on computer readable disk storage 76 for execution by CPU 71 via computer readable RAM 73. More specifically, detection function 30 scans data/parameters values in requests made by remote users to application 39 in computer 10 for the presence of SQL (or other relational database) queries. Typically the request, including its parameter/data fields, is HTTP, although the detection function 30 can detect malicious SQL queries en route to application 39 in computer 10 by other paths and in other formats. According to the present invention, detection function 30 scans the parameter value or data fields in the request to application 39 for combinations of SQL (or other relational database) query operands, characters and symbols and other search terms indicative of SQL injection. The combinations of query operands, characters and symbols and other search terms indicative of SQL injection are contained in a set of reference tables 32 as described below. Detection function 30 considers the presence of two or more combinations of query operands, characters and symbols and other search terms in a parameter value or data fields (heuristically) to identify an attack. Detection function 30 assigns a score to each combination and totals each score to determine if a threshold indicative of an SQL injection attack is exceeded. Also, some combinations of query operands, characters and symbols such as query injection, stored procedure execution, login bypass, and blind SQL injection indicate the type of malicious SQL injection. Because of the heuristic approach, i.e. consideration of two or more combinations of query operands, characters and symbols and other search terms in a list, there is no need to maintain a more lengthy list of specific search queries each one of which is known to be malicious. (Alternately, detection function 30 and its Tables 32 can reside in computer 10 logically interposed between TCP/IP adapter card 52 and application 39.)

The following is a more detailed description of detection function 30 in scanning for SQL injection the contents of parameter value or data fields in requests to application 39. In the illustrated embodiment, detection function 30 searches for and scores nine classes of query operands, characters and symbols, i.e. keywords, characters and symbols found in the parameter value or data fields: Data Definition Language (DDL), Data Modification Language (DML), Stored Procedures, Boolean Operators, Equality Operators, Functions, Keywords, Suspicious Symbols and Highly Suspicious Symbols. Detection function 30 can scan for and score other classes or keywords and symbols if characteristic of a SQL injection attack (as determined from experience or other factor). Detection function 30 will search for and score a keyword or symbol or a combination of keywords and symbols from each of these classes. For example, if detection function 30 detects in a data field the keyword WAITFOR (from the "Keywords" class), detection function 30 will assign a predetermined number of points as a score. In some cases, detection function 30 will not assign any points until encountering a combination of two or more specified keywords, characters or symbols typically in the same data field, such as a SELECT statement and a FROM statement in the same data field. The following are more detailed explanations of each of the foregoing classes of keywords, characters and symbols.

The "Data Definition Language" class of query operands, characters and symbols comprises a list of SQL statements used to create, alter or delete the structure of the data itself. These statements are used, for example, to create tables, add columns, create triggers, etc. SQL injection of DDL can DROP DATABASE or create a trigger to notify an attacker of an updated table. In the illustrated embodiment, the following table includes a list of DDL keywords detected and scored by detection function 30. Preferably, detection function 30 will not assign a score unless a respective "pre-trigger" term (indicated in the table) precedes the "trigger" term (indicated in the table) typically in the same data field. The points scored by detection function 30 for each combination of query operands, characters and symbols are based on the likelihood that the presence of the combination of query operands, characters and symbols is malicious, the sensitivity of the database and the type and magnitude of the damage that may result from the malicious query.

Table of Malicious Data Definition Language Query Operands

| Pre-Trigger | Trigger |
|---|---|
| ALTER | DATABASE |
| ALTER | FUNCTION |
| ALTER | PROC[EDURE] |
| ALTER | TABLE |
| ALTER | TRIGGER |
| ALTER | VIEW |
| ALTER | USER |
| CREATE | DATABASE |
| CREATE | FUNCTION |
| CREATE | INDEX |
| CREATE | PROC[EDURE] |
| CREATE | SCHEMA |
| CREATE | TABLE |
| CREATE | TRIGGER |
| CREATE | VIEW |
| CREATE | USER |
| DROP | DATABASE |
| DROP | FUNCTION |
| DROP | INDEX |
| DROP | PROC[EDURE] |
| DROP | TABLE |
| DROP | TRIGGER |
| DROP | VIEW |
| DROP | USER |
| TRUNCATE | TABLE |

The "Data Modification Language" class of query operands, characters and symbols, i.e. keywords, characters and symbols, is made up of SQL keywords, characters and symbols that allow for viewing, insertion, deletion and modification of data within the database. In the illustrated example, the DML query operands, characters and symbols are listed in the following table. Generally, DML statements make up the highest percentage of SQL statements used in malicious SQL injection. In the illustrated example, detection function 30 assigns scores to query operands, characters and symbols in the DML class which comprise both a pre-trigger keyword and a trigger keyword in the same data field. In the illustrated example, detection function 30 will increase the score upon detection of additional keywords, characters and symbols in the same data field for each pre-trigger. The points scored by detection function 30 for each combination of query operands, characters and symbols are based on the likelihood that the presence of the combination of query operands, characters and symbols is malicious, the sensitivity of the database and the type and magnitude of the damage that may result from the malicious query.

Table of Malicious Data Modification Language Query Operands, characters and symbols

| Pre-Trigger | Trigger | Supplemental Keyword | Supplemental Keyword | Supplemental Keyword | Supplemental Keyword |
|---|---|---|---|---|---|
| SELECT | FROM | WHERE | HAVING | GROUP BY | ORDER BY |
| SELECT | @@* | | | | |
| INSERT | VALUES | INTO | | | |
| UPDATE | SET | WHERE | FROM | | |
| DELETE | * | WHERE | FROM | | |

"Stored Procedures" class of query operands, characters and symbols are pre-written blocks of SQL procedure code that can be executed similarly to execution of a program. An "off the shelf" relational databases may include many stored procedures "out of the box" to complete standard administrative tasks. Many stored procedures pose a security risk if accessed through SQL injection (e.g. xp cmdshell). Typically, stored procedures on a SQL Server begin with "xp_" or "sp_". In the illustrated example, detection function 30 detects and scores the "Trigger" and "Supplemental" keywords indicated in the following table. The points scored by detection function 30 for each Trigger combination of query operands, characters and symbols are based on the likelihood that the presence of the combination of query operands, characters and symbols is malicious, the sensitivity of the database and the type and magnitude of the damage that may result from the malicious query. Detection function 30 increases the score if one or more "Supplemental Keywords" are found in addition to the trigger key words.

Table of Stored Procedures Query Operands, characters and symbols

| Trigger | Supplemental Keyword | Supplemental Keyword |
|---|---|---|
| xp_* | EXEC | MASTER[..] |
| sp_* | EXEC | MASTER[..] |

"Boolean Operators" class of operands, characters and symbols are often used in malicious SQL injection to bypass authentication. Many websites use the resulting status of a SQL query to determine whether a login was successful. The following is a query to authenticate a user based on username and password:
SELECT username FROM users WHERE username=<user_input> AND password=<user_input>
By using a Boolean operator, the following malicious SQL statement can always return true (and falsely indicate that the user is authentic):
SELECT username FROM users WHERE username=whatup OR 1=1—AND password=<user_input>
In this example, 1=1 is always true, so the malicious SQL query always returns a positive status falsely indicating that the user is authentic.
Boolean Operators are also used in malicious, blind SQL injection. This is an attack that uses the behavior of the site to determine the result of a query. For example, a blind SQL injection can inject a parameter value that returns a distinguishable page when the query succeeds. Then by tacking additional SQL statements on to the end of the blind SQL injection, the success status of the additional SQL can be determined. For example, a blind SQL injection could inject the following into a parameter and get a page returned if the SQL statement is true:
param=good_param_value AND ascii(lower(substring((SELECT TOP 1 name FROM sysobects WHERE xtype='U' ORDER BY 1 ASC),1,1)))=109
If a page is returned from this parameter, this would indicate that the first character of the first user-defined table name is 'm'. The AND and OR Boolean operators can be used in a malicious, blind SQL injection. Therefore, detection function 30 will search for and assign a score to either Boolean operator if found in a data field. The points scored by detection function 30 for each Boolean operand found in a data field are based on the likelihood that the presence of the Boolean operator in the data field is malicious, the sensitivity of the database and the type and magnitude of the damage that may result from the malicious query.

"Equality Operators" class of query symbols, i.e. symbols are =, >, <, <=, >=, < >, !<, !> and !=. These operators are typically required in a "host" SQL statement, but not typical required in a data field. The points scored by detection function 30 for each Equality operator found in a data field are based on the likelihood that the presence of the Equality operator in the data field is malicious, the sensitivity of the database and the type and magnitude of the damage that may result from the malicious query.

"Functions" class of query operands, characters and symbols are commonly used in SQL injection attacks. Detection function 30 will search for and score the following Functions: ASCII( ), LOWER( ), UPPER( ), SUBSTRING( ), SUBSTR( ), CHAR( ), LTRIM( ), RTRIM( ), LEFT( ) and RIGHT( ). The points scored by detection function 30 for each Functions operand found in a data field are based on the likelihood that the presence of the Functions operator in the data field is malicious, the sensitivity of the database and the type and magnitude of the damage that may result from the malicious query.

Some keywords that are typically used in malicious SQL injection are as follows: UNION, WAITFOR, NOT, ASC, DESC, LIKE, TOP and ROWNUM. Detection function 30 also searches for these query operands and adds points when they are detected. The points scored by detection function 30 for each of these keywords found in a data field are based on the likelihood that the presence of these keywords in the data field is malicious, the sensitivity of the database and the type and magnitude of the damage that may result from the malicious query.

"Suspicious Symbols" class of operands, characters and symbols, i.e. symbols occasionally used in SQL injection attacks are as follows: #, ", @, /* and */. The points scored by detection function 30 for each Suspicious Symbol found in a data field are based on the likelihood that the presence of the Suspicious Symbol in the data field is malicious, the sensitivity of the database and the type and magnitude of the damage that may result from the malicious query.

"Highly Suspicious Symbols" class of operands, characters and symbols, i.e. symbols often used in SQL injection attacks are as follows: -- (dash dash), ; (semicolon), and ' (single quote). The points scored by detection function 30 for each Highly Suspicious Symbol found in a data field can be preset or user-defined, and are based on the likelihood that the presence of the Highly Suspicious Symbol in the data field is malicious, the sensitivity of the database and the type and magnitude of the damage that may result from the malicious query. Typically, detection function 30 will assign a higher score to a Highly Suspicious Symbol than a (non highly) Suspicious Symbol.

Figure 2:
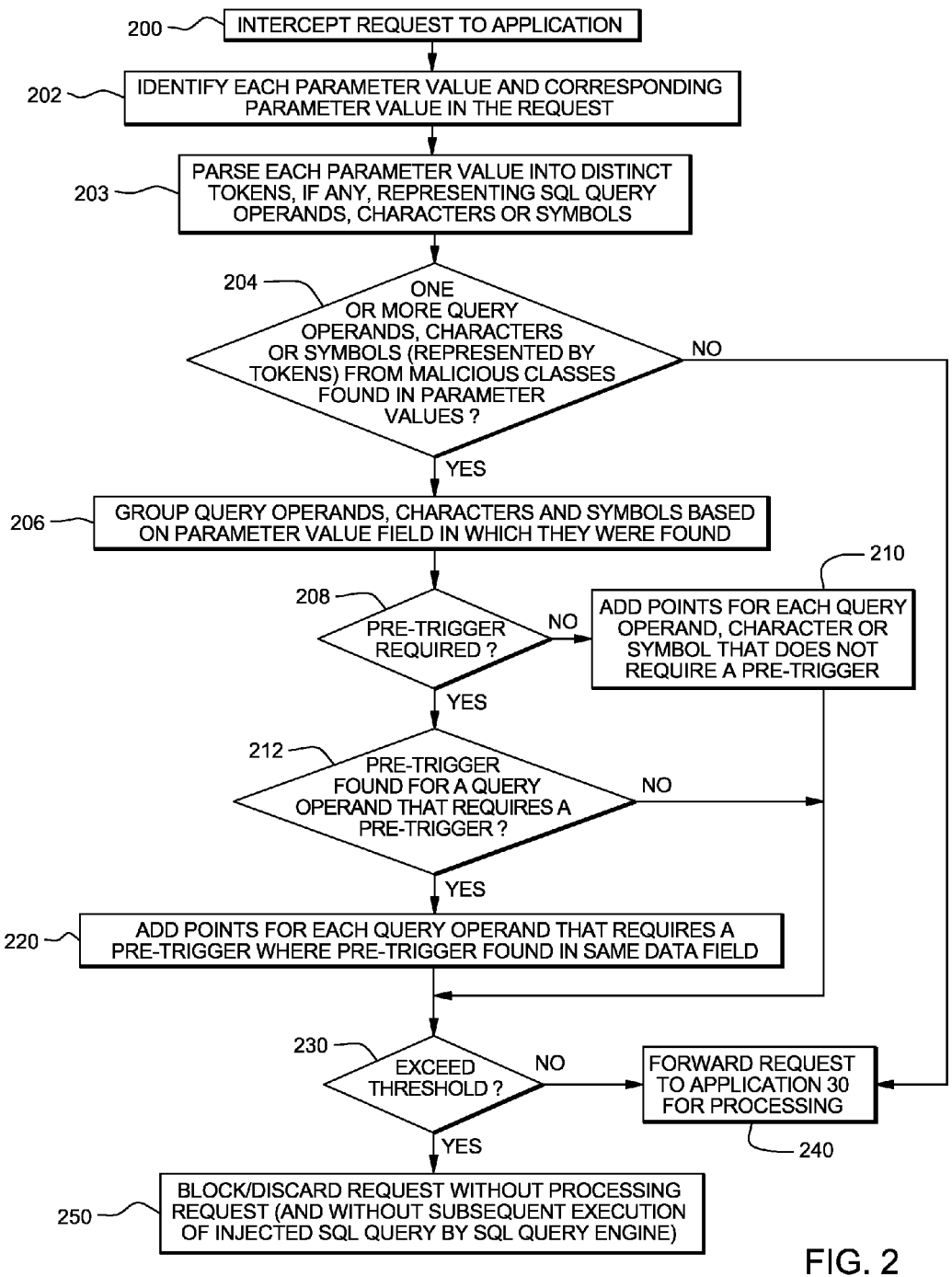
FIG. 2 is a flow chart of the detection program of FIG. 1.

FIG. 2 illustrates function and operation of detection function 30 in more detail. Detection function 30 is logically interposed between Internet 36 and application 39 to review all requests made to application 39 (via network 36) before being forwarded to application 39. Upon receipt of a request addressed to application 39 (step 200), detection function 30 reads each parameter value (or data) field in the request to identify each parameter and its corresponding parameter value(s) (step 202). In SQL injection, the parameter value(s) include query operands, characters and/or symbols used to define SQL queries. In contrast, in most benign requests that do not include SQL injection, the parameter value(s) are mainly or entirely data/information alone (not query operands and rarely characters or symbols). Next, detection function 30 parses each parameter value into distinct tokens (step 203). Each "token" is a string of characters which indicates a respective, predefined query operand (or word), character or symbol used to form SQL queries. (In the case of a single character or symbol, the token is the same as the single character or symbol.) Next, detection function 30 determines if any of the tokens corresponds to a query operand, character or symbol listed in one of the malicious classes in table 32 (decision 204). If detection function 30 does not detect any such query operands, characters or symbols in any of the parameter value fields (decision 204 no branch) i.e. detection function 30 has concluded that the request does not include an injected SQL query, then detection function 30 forwards the request to application 39 for processing (step 240). If the request to application 39 is a GET or POST request or other request (that does not include SQL injection) prompting a SQL query, application 39 can forward a corresponding SQL query to SQL execution engine 29 for execution. However, if detection function 30 detects a query operand, character or symbol in any of the parameter value fields that is listed in one of the malicious classes (decision 204, yes branch), then detection function 30 groups such query operands, characters and/or symbols, if any, based on the parameter value field in which they were found (step 206). Next, detection function 30 determines if a pre-trigger is required to assign and add the points for the query operand (decision 208). If no pre-trigger is required, detection function 30 adds the points for the query operand, character or symbol in the foregoing potentially-malicious classes which was found (step 210). If a pre-trigger is required to make the trigger query operand, character or symbol indicative of a malicious attack (decision 208, yes branch), detection function 30 determines if the pre-trigger has been found in the same parameter value field as the triggering query operand, character or symbol (decision 212). If the pre-trigger has not been found in the same parameter value field as the trigger query operand (decision 212, no branch), then detection function 30 does not add the points for the trigger query operand, character or symbol. However, if both the pre-trigger and trigger are found in the same parameter value field (decision 212, yes branch), then detection function 30 adds the points for the combination of trigger and pre-trigger query operands, characters and/or symbols (step 220). In steps 210 and 220, detection function 30 also adds the points for any Supplemental keywords and other query operands, characters or symbols indicative of a malicious attack that are found in the same parameter value field as the query operand, character or symbol, where the pre-trigger condition is needed and satisfied or where no pre-trigger is needed. Once the point total exceeds a preset or user-defined threshold (decision 230, yes branch), detection function 30 deems the request as malicious and blocks the request so it is not passed to application 39 (step 250) (and the injected SQL query is not subsequently executed by SQL query engine 29). The point threshold is based on the susceptibility of the data base to a SQL injection attack, the sensitivity of the data in the SQL database and the type and magnitude of the damage that may result from a malicious query. Typically, the threshold corresponds to identification of 2-4 query operands, characters and symbols or combinations of query operands, characters and symbols and supplemental keywords from the foregoing classes of potentially-malicious query operands, characters and symbols indicative of a malicious attack.

Detection function 30 records the class of SQL injection attack found in each type of parameter value field. The class(es) of query operands, characters and symbols in the type of parameter value field in which the attack was injected may indicate the type of malicious SQL injection being attempted, as follows:

| Table of SQL Injection Type | | | | | |
|---|---|---|---|---|---|
| | DDL | DML | Stored Processes | Boolean Operators | Equality Operators |
| Query Injection | | x | | | |
| DDL Injection | x | | | | |
| Stored Procedure Injection | | | x | | |
| Logic Injection | | | | x | x |
| Blind SQL Injection | | x | | x | x |

Detection function 30 notifies an operator of the type of attack (in addition to blocking the request) so the operator can take additional action corresponding to the type of attack, if available, such as configuring a firewall to block subsequent messages from the source IP address of the request.

Detection function 30 (in software form) can be installed into device 70 from a computer readable media 50 such as magnetic tape or disk, DVD, CD, memory stick, etc. or from the Internet via TCP/IP adapter card 52. During installation, the detection function 30 is stored on a computer readable media such as a hard drive storage 76 or memory 73 in computing device 70.

Based on the foregoing, system, method and program product for detecting malicious SQL injection have been disclosed. However, numerous modifications and substitutions can be made without deviating from the scope of the present invention. For example, other query operands, characters and symbols can be included in the foregoing classes as new types of SQL injection become known or more prevalent. Also, other classes of operands, characters and symbols can be defined and referenced by detection function 30 to identify new types of SQL injection attacks as they become known or more prevalent. Therefore, the present invention has been disclosed by way of illustration and not limitation, and reference should be made to the following claims to determine the scope of the present invention.

The invention claimed is:

1. A method for detecting a malicious Structured Query Language ("SQL") query injected into a parameter value field of a request, the method comprising the steps of:
a computer searching the parameter value field for (a) query commands of a first plurality and (b) combinations of two or more query commands, the two or more query commands of each of the combinations being different than each other and different than the query commands of the first plurality, and finding in the parameter value field at least one of the query commands of the first plurality and at least one of the combinations, each of the query commands of the first plurality and each of the combinations having respective, assigned scores indicating, at least in part, respective likelihoods that the SQL query is malicious;
the computer adding the respective scores of the at least one query command of the first plurality and the at least one combination;
the computer determining if a total of the added scores exceeds a predetermined threshold, and if so, the computer preventing execution of the request, and wherein the query commands of the first plurality are respective keywords and the two or more query commands of the combinations are respective keywords; and
wherein scores are not assigned separately to the respective query commands of the combinations such that if one, but not all, the query commands of one of the combinations is found in the parameter value field the one query command does not add to the total which is compared to the predetermined threshold.

2. The method of claim 1 wherein the query commands of the first plurality and the query commands in the combinations are characteristic of at least three of Data Definition Language, Data Modification Language, Stored Procedures, Boolean Operators and Functions.

3. The method of claim 1 wherein the one combination includes a pre-trigger query command and a trigger query command.

4. The method of claim 1 wherein at least one of the combinations includes a pre-trigger query command and a trigger query command.

5. The method of claim 1 wherein the preventing step comprises the step of the computer preventing the SQL query from being sent to a SQL data base manager responsible for executing SQL queries.

6. The method of claim 1 wherein one of the query commands of the first plurality is WaitFor, and the query commands in the combinations comprise at least three of Alter, Create, Drop and Select.

7. A computer system for detecting a malicious Structured Query Language ("SQL") query injected into a parameter value field of a request, the computer system comprising:
a CPU, a computer-readable memory and a computer-readable, tangible storage device;
first program instructions to search the parameter value field for (a) query commands of a first plurality and (b) combinations of two or more query commands, the two or more query commands of each of the combinations being different than each other and different than the query commands of the first plurality, and find in the parameter value field at least one of the query commands of the first plurality and at least one of the combinations, each of the query commands of the first plurality and each of the combinations having respective, assigned scores indicating, at least in part, respective likelihoods that the SQL query is malicious;
second program instructions to add the respective scores of the at least one query command of the first plurality and the at least one combination; and
third program instructions to determine if a total of the added scores exceeds a predetermined threshold, and if so, prevent execution of the request, and wherein the query commands of the first plurality are respective keywords and the two or more query commands of the combinations are respective keywords;
the first, second and third program instructions are stored on the computer-readable, tangible storage device for execution by the CPU via the computer readable memory; and
wherein the computer system does not assign the scores separately to the respective query commands of the combinations such that if one, but not all, the query commands of one of the combinations is found in the parameter value field the one query command does not add to the total which is compared to the predetermined threshold.

8. The computer system of claim 7 wherein the query commands of the first plurality and the query commands in the combinations are characteristic of at least three of Data Definition Language, Data Modification Language, Stored Procedures, Boolean Operators and Functions.

9. The computer system of claim 7 wherein the one combination includes a pre-trigger query command and a trigger query command.

10. The computer system of claim 7 wherein at least one of the combinations includes a pre-trigger query command and a trigger query command.

11. The computer system of claim 7 wherein the third program instructions prevent execution of the request by preventing the SQL query from being sent to a SQL data base manager responsible for executing SQL queries.

12. The computer system of claim 7 wherein one of the query commands of the first plurality is WaitFor, and the query commands in the combinations comprise at least three of Alter, Create, Drop and Select.

13. A computer program product for detecting a malicious Structured Query Language ("SQL") query injected into a parameter value field of a request, the computer program product comprising:
a computer-readable, tangible storage device;
first program instructions to search the parameter value field for (a) query commands of a first plurality and (b) combinations of two or more query commands, the two or more query commands of each of the combinations being different than each other and different than the query commands of the first plurality, and find in the parameter value field at least one of the query commands of the first plurality and at least one of the combinations, each of the query commands of the first plurality and each of the combinations having respective, assigned scores indicating, at least in part, respective likelihoods that the SQL query is malicious;

second program instructions to add the respective scores of the at least one query command of the first plurality and the at least one combination; and third program instructions to determine if a total of the added scores exceeds a predetermined threshold, and if so, prevent execution of the request, and wherein the query commands of the first plurality are respective keywords and the two or more query commands of the combinations are respective keywords;

wherein the computer program product does not assign the scores separately to the respective query commands of the combinations such that if one, but not all, the query commands of one of the combinations is found in the parameter value field the one query command does not add to the total which is compared to the predetermined threshold; and the first, second and third program instructions are stored on the computer-readable, tangible storage device.

14. The computer program product of claim 13 wherein the query commands of the first plurality and the query commands in the combinations are characteristic of at least three of Data Definition Language, Data Modification Language, Stored Procedures, Boolean Operators and Functions.

15. The computer program product of claim 13 wherein the one combination includes a pre-trigger query command and a trigger query command.

16. The computer program product of claim 13 wherein at least one of the combinations includes a pre-trigger query command and a trigger query command.

17. The computer program product of claim 13 wherein the third program instructions prevent execution of the request by preventing the SQL query from being sent to a SQL data base manager responsible for executing SQL queries.

18. The computer program product of claim 13 wherein one of the query commands of the first plurality is WaitFor, and the query commands in the combinations comprise at least three of Alter, Create, Drop and Select.

* * * * *